(12) United States Patent
Zhao

(10) Patent No.: US 11,402,683 B2
(45) Date of Patent: Aug. 2, 2022

(54) DISPLAY PANEL AND LIQUID CRYSTAL DISPLAY DEVICE

(71) Applicant: TCL China Star Optoelectronics Technology Co., Ltd., Shenzhen (CN)

(72) Inventor: Rentang Zhao, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 181 days.

(21) Appl. No.: 16/626,551

(22) PCT Filed: Dec. 19, 2019

(86) PCT No.: PCT/CN2019/126683
§ 371 (c)(1),
(2) Date: Dec. 25, 2019

(87) PCT Pub. No.: WO2021/109264
PCT Pub. Date: Jun. 10, 2021

(65) Prior Publication Data
US 2021/0333620 A1  Oct. 28, 2021

(30) Foreign Application Priority Data
Dec. 5, 2019 (CN) .......................... 201911234076.X

(51) Int. Cl.
G02F 1/1333 (2006.01)
G02F 1/1335 (2006.01)
G02F 1/1337 (2006.01)

(52) U.S. Cl.
CPC .. *G02F 1/133388* (2021.01); *G02F 1/133514* (2013.01); *G02F 1/133723* (2013.01)

(58) Field of Classification Search
None
See application file for complete search history.

(56) References Cited

U.S. PATENT DOCUMENTS

| | | | |
|---|---|---|---|
| 2015/0029428 A1* | 1/2015 | Wang | G02F 1/1362 349/42 |
| 2015/0131041 A1* | 5/2015 | Moriwaki | G02F 1/133345 349/106 |
| 2016/0349571 A1 | 12/2016 | Shin | |
| 2017/0110477 A1* | 4/2017 | Han | G02F 1/13394 |

(Continued)

FOREIGN PATENT DOCUMENTS

| | | |
|---|---|---|
| CN | 203444196 | 2/2014 |
| CN | 105242445 | 1/2016 |

(Continued)

*Primary Examiner* — Shan Liu

(57) ABSTRACT

A display panel and a liquid crystal display device are disclosed. The display panel includes an array substrate, a color filter substrate, an alignment film, a liquid crystal layer, and at least a bank portion. The bank portion is disposed on a peripheral region of the display area, and includes at least a first platform and at least a second platform. An edge of the alignment film adjoins the bank portion, and the first platform has a thickness different than a thickness of the second platform. By disposing the bank portion on the display panel, thicknesses of the alignment film in middle and peripheral areas of the display panel are substantially the same, and non-uniform brightness of the peripheral areas of the display area can be prevented.

9 Claims, 4 Drawing Sheets

(56) References Cited

U.S. PATENT DOCUMENTS

2017/0199431 A1* 7/2017 Kim .................. G02F 1/133512
2018/0217423 A1* 8/2018 Suzuki ................ G02F 1/13394
2019/0137805 A1* 5/2019 Huang .................. G02F 1/1339
2019/0331949 A1* 10/2019 Veidhes ............ G02F 1/133723
2020/0081301 A1* 3/2020 Yang .................... G02F 1/1339

FOREIGN PATENT DOCUMENTS

| CN | 109143689 | | 1/2019 |
| CN | 109143689 A | * | 1/2019 |
| CN | 209103055 | | 7/2019 |
| CN | 209215824 | | 8/2019 |
| CN | 209343099 | | 9/2019 |

* cited by examiner

DISPLAY PANEL AND LIQUID CRYSTAL DISPLAY DEVICE

RELATED APPLICATIONS

This application is a National Phase of PCT Patent Application No. PCT/CN2019/126683 having International filing date of Dec. 19, 2019, which claims the benefit of priority of Chinese Patent Application No. 201911234076.X filed on Dec. 5, 2019. The contents of the above applications are all incorporated by reference as if fully set forth herein in their entirety.

FIELD AND BACKGROUND OF THE INVENTION

The present invention relates to a technical field of displays, and particularly to, a display panel and a liquid crystal display device.

Manufacturing processes of a liquid crystal display panel includes an array substrate 91 (as shown in FIG. 1) and a color filter substrate 92 fabricated in an array process at a front stage, a cell-assembly process at an intermediate stage to assemble the array substrate and the color filter substrate so that liquid crystals (as shown in FIG. 1) can be injected in between the two substrates, and a modular process at a rear stage. A panel being completed is assembled with a backlight module, panel driver circuits, and frames to be a one integral piece.

Displayed images can only be controlled by liquid crystals formed in an ordered alignment in the cell-assembly process. The ordered alignment of the liquid crystals is mainly realized by polyimide (PI) alignment film. In panel production, PI liquid 93 is mainly applied to a surface of a substrate by inkjet printing, and then PI is formed into an alignment film by a heating and baking process. As shown in FIG. 2, in a PI film fabrication process, PI droplets dropped on the substrate will flow to peripheries until they are fixed after the baking process is completed. In this process, a PI film at an edge of the panel appears to be different in thickness, that is, a film thickness gradient area appears. Different thicknesses of the PI film have different alignment forces on liquid crystals, and there appears to be some film thickness gradient areas on edges of an active area. An alignment force on liquid crystals in the film thickness gradient areas is not consistent with an alignment force on liquid crystals in an inner display area, resulting in a situation that rotation degrees of liquid crystals at edges of the panel are different than that of liquid crystals at inner part of the panel when driving the panel, thereby causing different brightness between the film thickness gradient areas at the edges and normal areas at the inner part, and giving rise to a problem of non-uniform brightness (i.e. mura) at peripheries of the panel.

SUMMARY OF THE INVENTION

An object of the present invention is to provide a display panel having improved edge portion structure to avoid a situation that an organic film tends to form film thickness gradient areas on peripheral regions of a display area after film formation of an organic solution, thereby to achieve an effect of uniform display brightness.

In order to achieve the above-mentioned object, the present application provides a display panel, comprising a display area and a non-display area surrounding the display area, and a peripheral region defined on the display area adjoining the non-display area, wherein the display panel comprises: an array substrate comprising a functional film layer disposed along the display area and the non-display area; a color filter substrate disposed facing the array substrate; an alignment film laminated on the functional film layer and a surface of the color filter substrate facing the array substrate; a liquid crystal layer disposed between the array substrate and the color filter substrate; and a bank portion disposed on the peripheral region of the display area, and comprising at least a first platform and at least a second platform, wherein an edge of the alignment film adjoins the bank portion, and the at least a first platform has a thickness different than a thickness of the at least a second platform.

Further, the second platform adjoins the first platform and is located away from the display area relative to the first platform, wherein the thickness of the second platform is less than that of the first platform.

Further, the bank portion further comprises a third platform having a thickness the same as that of the first platform, and the second platform is disposed between the first platform and the third platform so that the bank portion is concave-convex in shape.

Further, the second platform adjoins the first platform, and the thickness of the second platform is greater than that of the first platform, so that the bank portion is stair-like in shape.

Further, a thickness difference between the first platform and the second platform ranges from 0.01 microns (um) to 3.5 um.

Further, a height of the alignment film in the display area is coplanar with a height of the alignment film in the peripheral region.

Further, the functional film layer comprises a first electrode layer and a passivation layer each comprising the bank portion disposed corresponding to each other.

Further, a side of the color filter substrate facing the array substrate is provided with a black light shielding layer, a color filter layer, and a second electrode layer, each provided with the bank portion disposed corresponding to each other.

Further, each of a side of the array substrate and a side of the color filter substrate is provided with a polarizer, and the alignment film is made of polyimide, wherein the bank portion is formed through a photolithography process using a halftone mask.

The present application further provides a liquid crystal display device, comprising a backlight module and the display panel of the above-mentioned embodiment.

The present application further provides a display panel, comprising a display area and a non-display area surrounding the display area, and a peripheral region defined on the display area adjoining the non-display area, wherein the display panel comprises an array substrate comprising a functional film layer disposed along the display area and the non-display area; a color filter substrate disposed facing the array substrate; an alignment film laminated on the functional film layer and a surface of the color filter substrate facing the array substrate; a liquid crystal layer disposed between the array substrate and the color filter substrate; and a bank portion disposed on the peripheral region of the display area, and comprising at least a first platform and at least a second platform, wherein an edge of the alignment film adjoins the bank portion, and the at least a first platform has a thickness different than a thickness of the at least a second platform; wherein a height of the alignment film in the display area is coplanar with a height of the alignment film in the peripheral region, and the functional film layer is provided with the bank portion.

Based on the display panel and the liquid crystal display device of the present application, by using the thickness variation structure of the concave-convex bank portion or the stair-like bank portion disposed on the display area, the rapid movement of the PI liquid can be effectively hindered, thereby rendering accumulation of the PI liquid and causing the PI liquid to flow back, so that thicknesses of the alignment film 10 in middle and peripheral areas of the display panel 100 are substantially the same. In this manner, the present application effectively overcomes drawbacks that conventional alignment films are likely to form film thickness gradient areas in peripheral regions of display areas, resulting in non-uniform film thickness of the alignment films, affecting liquid crystals rotation, and further causing different brightness between middle and peripheral areas of the display panel.

DESCRIPTION OF SPECIFIC EMBODIMENTS OF THE INVENTION

The following embodiments are referring to the accompanying drawings for exemplifying specific implementable embodiments of the present invention. Directional terms described by the present invention, such as upper, lower, front, back, left, right, inner, outer, side, etc., are only directions by referring to the accompanying drawings, and thus the used directional terms are used to describe and understand the present invention, but the present invention is not limited thereto.

Figure 1:
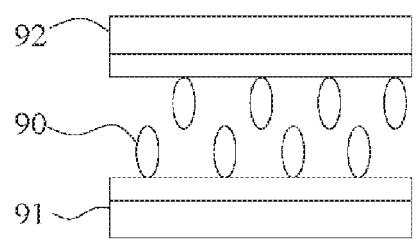
FIG. 1 is a schematic view of liquid crystal alignment of a conventional display panel.
Figure 2:
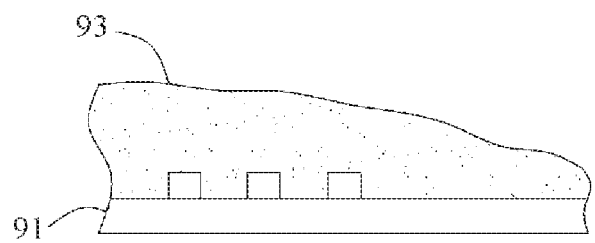
FIG. 2 is a schematic view of a film thickness variation area of a conventional polyimide film layer.
Figure 3:
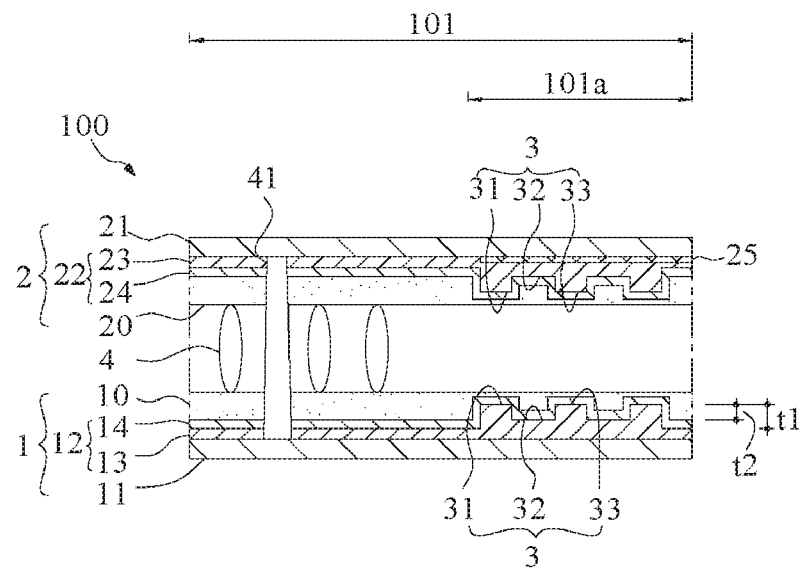
FIG. 3 is a schematic structural view of a display panel in accordance with an embodiment of the present application.
Figure 7:
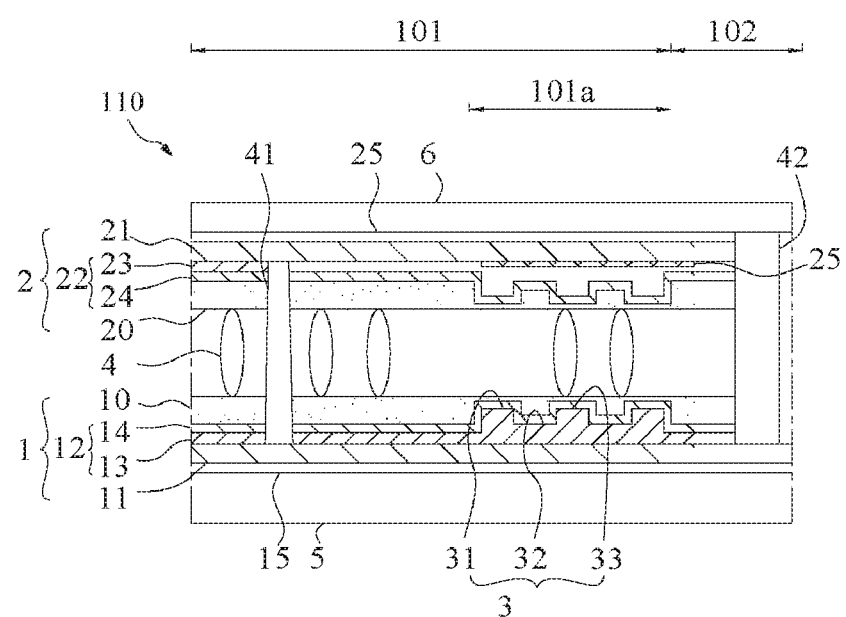
FIG. 7 is a schematic structural view of a liquid crystal display device in accordance with an embodiment of the present application.

The present application relates to a display panel, and particularly to a display panel adapted for a liquid crystal display. Please refer to FIG. 3. FIG. 3 is a schematic structural view of a display panel in accordance with an embodiment of the present application. The present application provides a display panel 100 divided into a display area 101 and a non-display area 102 surrounding the display area 101 (as shown in FIG. 7) according to areas for displaying images, wherein a peripheral region 101a is defined on the display area 101 adjoining the non-display area 102. As shown in FIG. 3, the display panel 100 includes an array substrate 1, a color filter substrate 2 disposed facing the array substrate 1, and a liquid crystal layer 4 disposed between the array substrate 1 and the color filter substrate 2. The array substrate 1 includes a base substrate 11, a functional film layer 12 disposed along the display area 101 and the non-display area 102, and an alignment film 10 laminated on the functional film layer 12. The liquid crystal layer 4 includes liquid crystal molecules disposed in a space formed by a plurality of photo spacers 41 disposed between the array substrate 1 and the color filter substrate 2. Furthermore, the functional film layer 12 includes a passivation layer 13 and a first electrode layer 14 disposed on the passivation layer 13. The first electrode layer 14 is a pixel electrode layer provided with the alignment film 10 on the first electrode layer 14. It should be noted that most of the structure of the display panel of the present application is the same as that of a general liquid crystal display panel. That is, the functional film layer may include a buffer layer and a plurality of thin-film transistors (not shown) arranged in an array all laminated in turn. Other structure relates to conventional liquid crystal display panels is not described in detail here.

Please continue referring to FIG. 3. Particularly, in the present application, the array substrate 1 is provided with a bank portion 3 disposed on the peripheral region 101a of the display area 101. That is, the passivation layer 13 and the first electrode layer 14 of the functional film layer 12, or other film layers included in the functional film layer 12 may be provided with the bank portion 3, respectively. In other words, the bank portions 3 included in each of the layers are disposed corresponding to each other and are laminated to one another. As shown in FIG. 3, in this embodiment, the bank portion 3 includes a first platform 31, a second platform 32, and a third platform 33. An edge of the alignment film 10 adjoins the bank portion 3. Particularly, one end of the second platform 32 adjoins the first platform 31 and is located away from the display area 101 relative to the first platform 31, and another end of the second platform 32 adjoins the third platform 33. Specifically, the second platform 32 has a thickness t2 less than a thickness t1 of the first plat form 31, and the third platform 33 has a thickness the same as that of the first platform 31. That is, the second platform 32 is disposed between the first platform 31 and the third platform 33 to enable the bank portion 3 to be concave-convex in shape. The concave-convex bank portion 3 is formed through a photolithography process using a halftone mask, wherein the photolithography process includes exposure, development, and etching processes.

In a process of manufacturing a panel, polyimide (PI) liquid is applied to a surface of a substrate by inkjet printing, and then the PI liquid is formed into an alignment film by a heating and baking process, wherein PI droplets dropped on the substrate are flowing toward peripheries until they are fixed after the baking process is completed. Because the PI liquid will continue to flow toward the peripheries during printing, a film thickness variation area is therefore produced on the peripheries. That is, the film thickness variation area is formed on a peripheral region of the display area and the non-display area, causing brightness of the film thickness variation area to be different than brightness of a normal area in inner part of the display panel.

Figure 4:
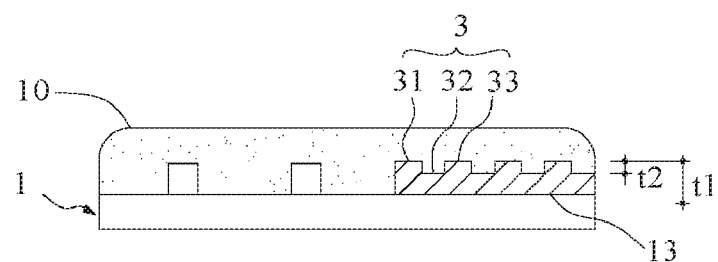
FIG. 4 is a schematic partial enlarged view of the display panel of FIG. 3.

Please refer to FIG. 4 in combination with FIG. 3. FIG. 4 is a schematic partial enlarged view of the display panel of FIG. 3, taking the bank portion 3 provided on the passivation layer 13 as an example. As shown in FIG. 4, the present application provides the bank portion 3 to form a film thickness variation structure, so that rapid movement of the PI liquid can be effectively hindered when the PI liquid is flowing to the first platform 31, the second platform 32, and the third platform 33, thereby rendering accumulation of the PI liquid and causing the PI liquid to flow back. As a result, a peripheral region originally formed with a thin thickness may be covered by the PI liquid flowing back as replenishment of the PI liquid, and the alignment film 10 can be formed after curing. Furthermore, thicknesses of the alignment film 10 in middle and peripheral areas of the display panel 100 are substantially the same. That is, a height of the alignment film 10 in a middle of the display area 101 is coplanar with a height of the alignment film 10 in the peripheral region 101a. Specifically, a thickness difference between the first platform 31 and the second platform 32, or between the third platform 33 and the second platform 32 ranges from 0.01 microns (um) to 3.5 um (i.e. a difference between the thickness t1 and t2). Preferably, the thickness difference should not be too large so that a back flowing effect of the PI liquid will not be affected.

Please continue referring to FIG. 3. A side of the color filter substrate 2 facing the array substrate 1 of the present application is provided with a glass substrate 21, a functional film layer 22, and an alignment film 20 disposed on a side of the functional film layer 22. The functional film layer 22 may include a black light shielding layer 25, a color filter layer 23, and a second electrode layer 24, each may be provided with the bank portion 3 disposed corresponding to each other, wherein the second electrode layer 24 is a common electrode layer. Liquid crystal molecules rotate as desired through the alignment films 10 and 20 under a voltage applied. It should be noted that most of the structure of the color filter substrate 2 of the present application is the same as a color filter substrate of a general liquid crystal display panel. That is, the functional film layer 22 may further include other metal film layers or polymer film layers, which will not be described in detail here.

Figure 5:
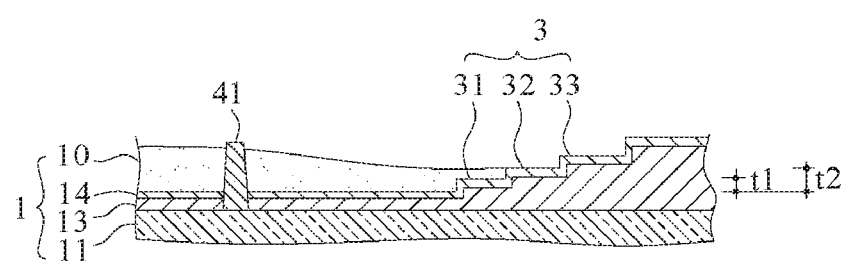
FIG. 5 is a schematic structural view of a display panel in accordance with another embodiment of the present application.

Please refer to FIG. 5. FIG. 5 is a schematic structural view of a display panel in accordance with another embodiment of the present application. A display panel of this embodiment is different from the embodiment of FIG. 4 in that a structure of a bank portion, while structures of other components are the same, and the same structures will not be reiterated in this embodiment. As shown in FIG. 5, a display panel 100 includes a bank portion 3 disposed on the peripheral region 101a of the display area 101. The bank portion 3 includes a first platform 31 and a second platform 32. Specifically, a thickness t2 of the second platform 32 is greater than a thickness t1 of the first platform 31, so that the bank portion 3 has a stair-like structure, wherein a thickness difference between the first platform 31 and the second platform 32 ranges from 0.01 um to 3.5 um. In this embodiment, the second platform 32 further adjoins a plurality of the third platforms 33 each having a thickness greater than that of the second platform 32, and each of the thicknesses of the third platforms 33 increasingly increases such that the bank portion 3 forms the stair-like configuration of a plurality of steps extending upward.

Figure 6:
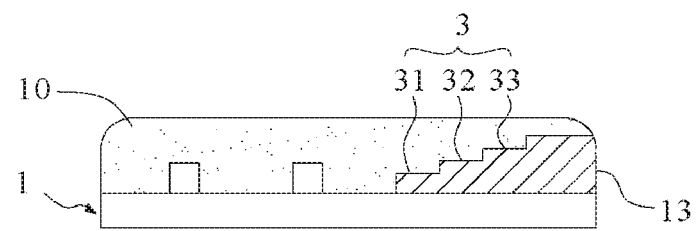
FIG. 6 is a schematic partial enlarged view of the display panel of FIG. 5.

Please refer to FIG. 6. FIG. 6 is a schematic partial enlarged view of the display panel of FIG. 5, taking the bank portion 3 provided on the passivation layer 13 as an example. The bank portion 3 of this embodiment can achieve an effect the same as that of the bank portion as shown in FIG. 4. That is, by using a thickness variation structure, the stair-like bank portion 3 can effectively hinder rapid movement of the PI liquid, thereby rendering accumulation of the PI liquid and causing the PI liquid to flow back. In this manner, thicknesses of the alignment film 10 in middle and peripheral areas of the display panel 100 are substantially the same.

FIG. 7 is a schematic structural view of a liquid crystal display device in accordance with an embodiment of the present application. As shown in FIG. 7, the liquid crystal display dive 110 of the present application includes the display panel 100 of the aforementioned embodiments, and a backlight module 5 disposed on a side of the display panel 100. Specifically, sides of the array substrate 1 and the color filter substrate 2 are provided with polarizers 15 and 25, respectively. Opposite sides of the polarizers 15 and 25 are provided with the backlight module 5 and a cover 6, respectively, and the liquid crystal layer 4 is encapsulated by a sealant 42 to complete the assembly.

Based on the display panel and the liquid crystal display device of the present application, by using the thickness variation structure of the concave-convex bank portion or the stair-like bank portion disposed on the display area, the rapid movement of the PI liquid can be effectively hindered, thereby rendering accumulation of the PI liquid and causing the PI liquid to flow back, so that thicknesses of the alignment film 10 in middle and peripheral areas of the display panel 100 are substantially the same. In this manner, the present application effectively overcomes drawbacks that conventional alignment films are likely to form film thickness gradient areas in peripheral regions of display areas, resulting in non-uniform film thickness of the alignment films, affecting liquid crystals rotation, and further causing different brightness between middle and peripheral areas of the display panel.

Accordingly, although the present invention has been disclosed as a preferred embodiment, it is not intended to limit the present invention. Those skilled in the art without departing from the scope of the present invention may make various changes or modifications, and thus the scope of the present invention should be after the appended claims and their equivalents.

What is claimed is:

1. A display panel, comprising:
a display area and a non-display area surrounding the display area, and a peripheral region defined on the display area adjoining the non-display area, wherein the display panel comprises:
an array substrate comprising a functional film layer disposed along the display area and the non-display area and comprising a passivation layer and a first electrode layer laminated on the passivation layer;
a color filter substrate disposed facing the array substrate;
an alignment film laminated on the functional film layer and a surface of the color filter substrate facing the array substrate; and
a liquid crystal layer disposed between the array substrate and the color filter substrate;
wherein the functional film layer defines at least a bank portion disposed on the peripheral region of the display area and a non-bank portion located in the display area and adjoining the bank portion, wherein the bank portion comprises at least a first platform and at least a second platform adjoining the first platform, and the at least a first platform has a thickness different than a thickness of the at least a second platform;
wherein the first platform has a first top surface, the second platform has a second top surface, and the non-bank portion has a third top surface, wherein the bank portion and the non-bank portion are in contact and coated with the alignment film, and each of the first top surface and the second top surface is located at a vertical level higher than the third top surface; and
wherein each of the passivation layer and the first electrode layer is extending from the non-bank portion to the first platform and the second platform, and a top surface of the first electrode layer forms each of the first, second and third top surfaces, respectively.

2. The display panel of claim 1, wherein the second platform is located away from the display area relative to the first platform, wherein the thickness of the second platform is less than that of the first platform.

3. The display panel of claim 2, wherein the bank portion further comprises a third platform having a thickness the same as that of the first platform, and the second platform is disposed between the first platform and the third platform so that the bank portion is concave-convex in shape.

4. The display panel of claim 1, wherein the thickness of the second platform is greater than that of the first platform, so that the bank portion is stair-like in shape.

5. The display panel of claim 1, wherein a thickness difference between the first platform and the second platform ranges from 0.01 microns (um) to 3.5 um.

6. The display panel of claim 1, wherein a height of the alignment film in the display area is coplanar with a height of the alignment film in the peripheral region.

7. The display panel of claim 1, wherein a side of the color filter substrate facing the array substrate is provided with a black light shielding layer, a color filter layer, and a second electrode layer, each provided with a bank portion disposed corresponding to each other.

8. The display panel of claim 1, wherein each of a side of the array substrate and a side of the color filter substrate is provided with a polarizer, and the alignment film is made of polyimide, wherein the bank portion is formed through a photolithography process using a halftone mask.

9. A liquid crystal display device, comprising a backlight module and the display panel of claim 1.

* * * * *